United States Patent
Pant et al.

(10) Patent No.: US 8,321,657 B2
(45) Date of Patent: Nov. 27, 2012

(54) SYSTEM AND METHOD FOR BIOS AND CONTROLLER COMMUNICATION

(75) Inventors: Alok Pant, Cedar Park, TX (US); James Walker, Cedar Park, TX (US); Loren Fredlund, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 12/580,410

(22) Filed: Oct. 16, 2009

(65) Prior Publication Data

US 2011/0093689 A1    Apr. 21, 2011

(51) Int. Cl.
*G06F 9/00* (2006.01)
*G06F 11/30* (2006.01)

(52) U.S. Cl. .............. 713/2; 713/190; 713/164; 726/22; 726/26

(58) Field of Classification Search .................... 713/1, 2
See application file for complete search history.

(56) References Cited

U.S. PATENT DOCUMENTS

| | | | | |
|---|---|---|---|---|
| 7,986,786 B2 * | 7/2011 | Ibrahim et al. | ................ | 380/277 |
| 2002/0099950 A1 * | 7/2002 | Smith | .......................... | 713/200 |
| 2005/0021968 A1 * | 1/2005 | Zimmer et al. | ............... | 713/176 |
| 2007/0168574 A1 | 7/2007 | Martinez et al. | | |
| 2007/0239996 A1 * | 10/2007 | Cromer et al. | ................ | 713/193 |
| 2008/0077800 A1 * | 3/2008 | Wang et al. | .................... | 713/187 |
| 2008/0092216 A1 | 4/2008 | Kawano et al. | | |
| 2008/0313471 A1 * | 12/2008 | Huang et al. | .................. | 713/185 |
| 2009/0222915 A1 * | 9/2009 | Challener et al. | ............... | 726/21 |
| 2010/0111309 A1 * | 5/2010 | Khatri et al. | ................... | 380/283 |

* cited by examiner

*Primary Examiner* — Taghi Arani
*Assistant Examiner* — Mohammad L Rahman
(74) *Attorney, Agent, or Firm* — Baker Botts L.L.P.

(57) ABSTRACT

A system and method for BIOS and controller communication. An information handling system comprises a central processing unit coupled to a memory. The memory further comprises a BIOS. The information handling system further comprises a controller coupled to a nonvolatile memory, and a register coupled to the central processing unit and the controller. The controller is operable to initialize communication with the BIOS, and service commands from the BIOS. The central processing unit is operable to initialize communication with the controller, and send commands to the controller. A method for communication between a BIOS and a controller in an information handling system comprises initializing communication between the BIOS and the controller. The method further comprises encrypting a command using a key by the BIOS, and sending the command to the controller. The controller processes the command, and the BIOS receives the result.

6 Claims, 3 Drawing Sheets

SYSTEM AND METHOD FOR BIOS AND CONTROLLER COMMUNICATION

TECHNICAL FIELD

The present disclosure relates generally to the operation of computer systems and information handling systems, and, more particularly, to a system and method for BIOS and controller communication.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a controller, which may be embedded, with a nonvolatile memory module. The controller may be used to store various pieces of information necessary for the information handling system to operate, such as the password or encryption key used by an attached hard disk drive, especially if the hard disk drive contains the primary boot partition. The controller may also be used to manage or configure the information handling system. Tasks that a controller may perform include preparing the system to enter a standby or hibernation state, manage power consumption by attached peripherals, or control the system's fans. The controller may receive commands from the information handling system's BIOS. Because of the sensitive nature of the information contained in the controller, and the controller's ability to significantly alter the operation of the information handling system, it is desirable to provide a system and method for BIOS and controller communication.

SUMMARY

In accordance with the present disclosure, a system and method for BIOS and controller communication is provided. An information handling system comprises a central processing unit coupled to a memory. The memory further comprises a BIOS. The information handling system further comprises a controller coupled to a nonvolatile memory, and a register coupled to the central processing unit and the controller. The controller is operable to initialize communication with the BIOS, and service commands from the BIOS. The central processing unit is operable to initialize communication with the controller, and send commands to the controller.

A method for communication between a BIOS and a controller in an information handling system comprises initializing communication between the BIOS and the controller. The method further comprises encrypting a command using a key by the BIOS, and sending the command to the controller. The controller processes the command, and the BIOS receives the result.

A software for communication between a BIOS and a controller in an information handling system is embodied in a computer-readable medium. When executed, the software is operable to initialize communication between the BIOS and the controller. The software is further operable to encrypt a command using a key by the BIOS, send the command to the controller, process the command by the controller, and receive the result by the BIOS.

The system and method disclosed herein is technically advantageous because the use of encryption ensures that commands received by the controller are from secure or trusted code. A second advantage of the system and method is that it cannot be readily disabled by other code running on the system, unlike systems and methods that use an IO trap mechanism. A third advantage of the system and method is that non-critical embedded controller commands can be made accessible to non-trusted code while access to critical commands can be limited to only trusted code. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
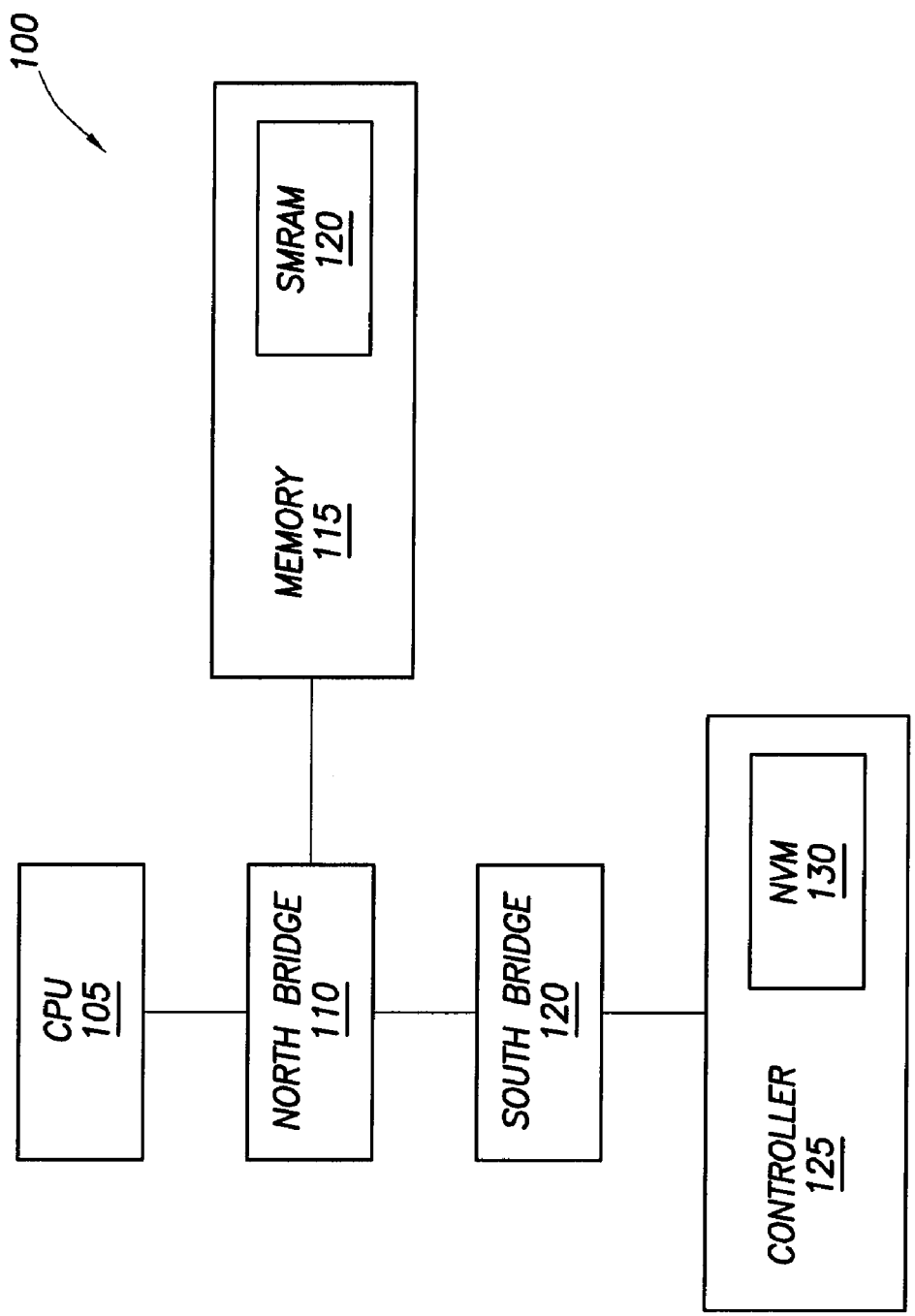
FIG. 1 is a diagram of an information handling system with a controller.

Shown in FIG. 1 is a diagram of an information handling system with a controller as disclosed herein. Information handling system 100 has a central processing unit (CPU) 105 coupled to a north bridge 110. North bridge 110 provides high speed connectivity between the CPU 105 and other high speed devices, such as main memory 115. Main memory 115 includes a region of memory accessible only when CPU 105 is operating in system management mode (SMM). This region of memory is referred to as system management random access memory (SMRAM) 120. South bridge 120 connects lower speed devices, such as serial ports, storage controllers, network interfaces, or the controller 125, to the north bridge 110. The controller 125 may contain a region of nonvolatile memory (NVM) 130 for the storage of system information. The nonvolatile memory 130 is not directly accessible by other information handling system components. The controller 125 communicates with the BIOS through a shared register, or mailbox register. The controller 125 uses the register to receive commands, or send data, such as information stored in the nonvolatile memory, to the BIOS.

Figure 2:
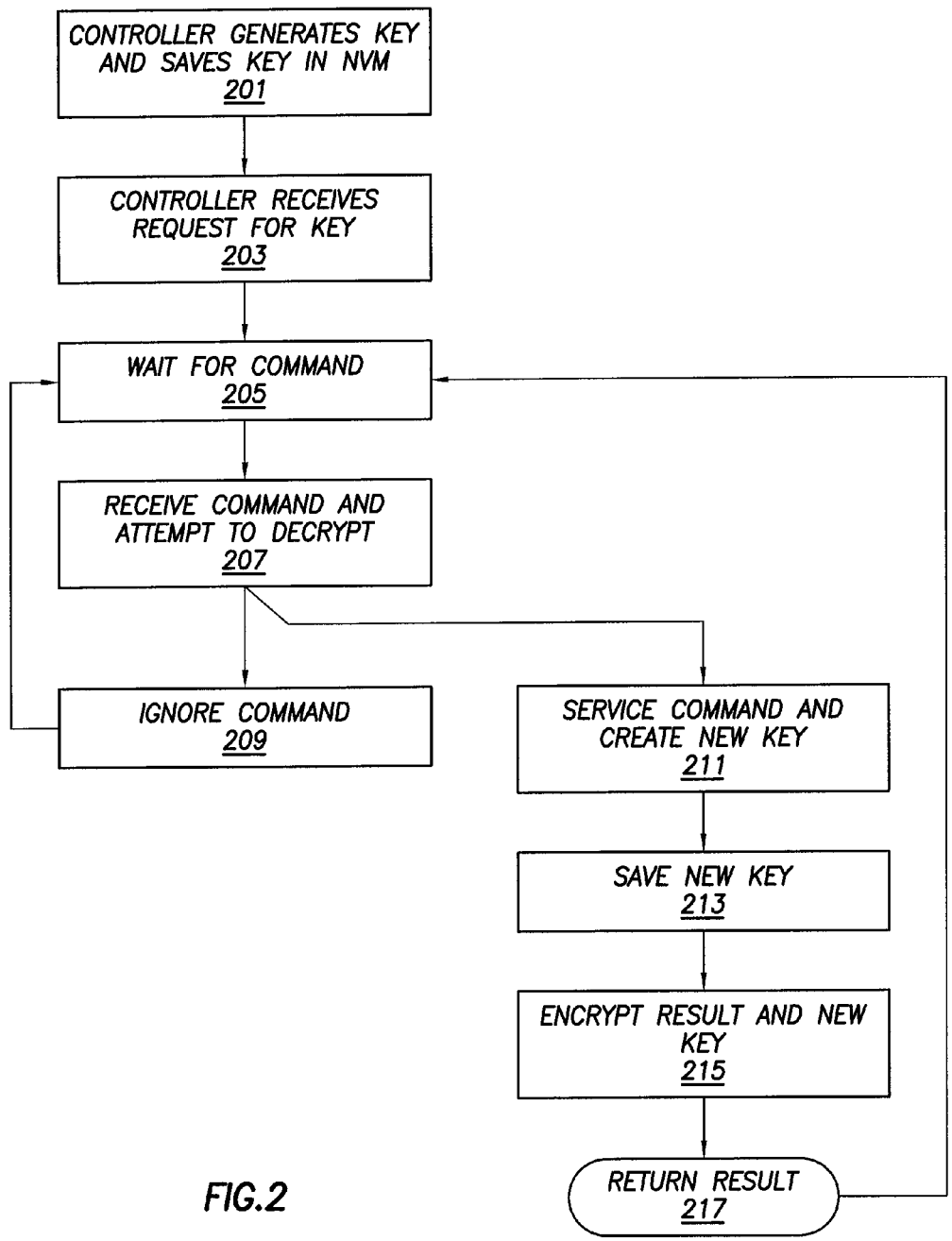
FIG. 2 illustrates the operation of the controller.

FIG. 2 illustrates the operation of the controller disclosed herein. At step 201, the controller generates a random number or encryption key, referred to as the key, in the controller's nonvolatile memory or other memory only accessible to the controller. At step 203, the controller waits until the system is initialized and the BIOS sends a signal or command requesting the key. This may occur early in the initialization of the information handling system before any non-trusted software is loaded. The controller will return the key through the register to the BIOS. The controller will then wait until it receives a command from the BIOS through the register at step 205. At step 207, the controller receives a command through the register. The controller will verify that the command is from the BIOS by attempting to decrypt the command using the key. The decryption may be as simple as performing an exclusive OR operation on the contents of the register with the key value, or some other decryption method. If the decryption fails, the controller ignores the command at step 209, and continues to wait for a command at step 205. If the decryption is successful, then the controller services the command at step 211. The controller may also generate a new key value. At step 213, the embedded controller saves the new key value. At step 215, the controller prepares the result of the command. In addition to the return value, the embedded controller may also return the new key. To prevent non-trusted software from learning the value of the key, the data and key are encrypted using the prior key (the key used to encrypt the command currently being processed). At step 217, the controller places the data and key in encrypted form in the register and signals the BIOS that the command is finished. The controller waits for another instruction from the BIOS at step 205. The controller will continue to function normally and handle system events while it waits for the next command from the BIOS.

In another embodiment of the system and method disclosed herein, the operation of the system and method at step 209 may be modified. In some instances, a subset of controller commands may be deemed non-critical. Allowing applications other than the BIOS, such as programs operating within the operating system or the operating system itself, to send such commands to the controller directly may be desirable. In this instance, the controller may read a command from the register, and if the command is not encrypted, first determine whether the command is a non-critical command. If the command is a non-critical command, then the controller may service the command and place an unencrypted return value into the register. The controller then returns step 205 to wait for the next command. The controller will not generate a new key value or return the key value to the calling program.

Figure 3:
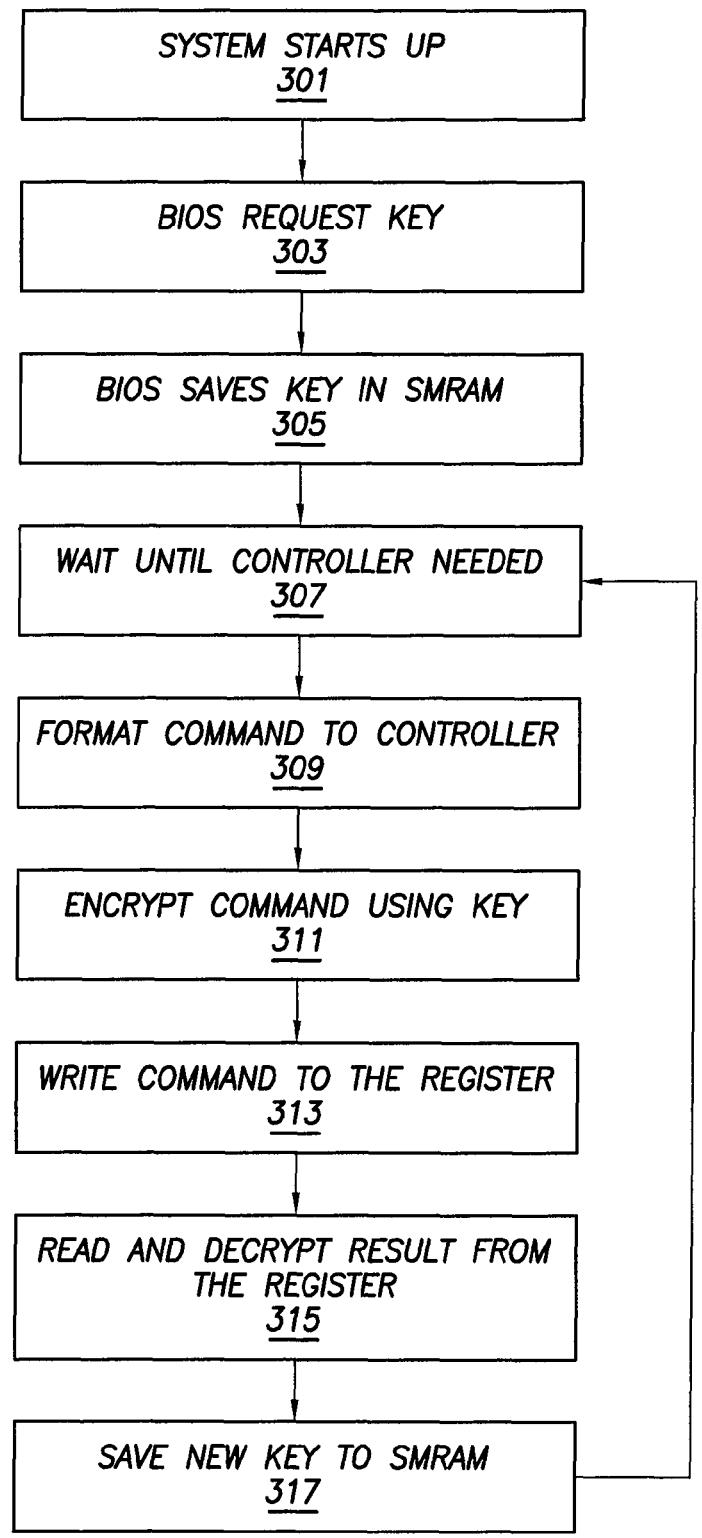
FIG. 3 illustrates the operation of the system BIOS.

FIG. 3 illustrates the operation of the system BIOS as disclosed herein. At step 301, the information handling system is started. At step 303, the BIOS is loaded and in control of the system. Non-trusted code has not yet been executed by the CPU. The BIOS places a command requesting the initial key value in the register or otherwise signals the controller. At step 305, the BIOS receives a signal from the controller indicating that the initial key value is in the register. The BIOS will then store the key value in the SMRAM. The SMRAM is a region of memory that is only accessible to the CPU when it is operating in the system management mode. If an application attempts to access SMRAM when it is not SMM mode, an exception may be generated by the CPU, and the information handling system's memory controller will deny access to the SMRAM. At step 307, the BIOS continues to operate until it needs to request service from the embedded controller. For example, the BIOS may need to place the system into a standby state, or request the encryption password used by the hard drive which may be stored in the controller's nonvolatile memory. At step 309, the BIOS formats the command to be sent to the controller. At step 311, the command is encrypted using the key stored in SMRAM. The encryption may be an exclusive OR operation using the key, or any other encryption method. The encrypted command is placed in the register at step 313 and the controller is sent a signal. At step 315, the BIOS receives a signal indicating that the result from the command sent to the controller is in the register. The BIOS decrypts the contents of the register. At step 317, the new key is saved in SMRAM.

An extra safeguard may be implemented to maintain trusted communication between the BIOS and controller. After the controller receives a valid command, the embedded controller may generate a system management interrupt. When the interrupt is generated, the BIOS will handle the interrupt. While in system management mode, the BIOS may write a confirmation message, such as a special bit pattern, in the register to confirm that the BIOS generated the command. When the system returns from the interrupt, the controller may check the register's contents to verify that confirmation has been received.

Although the present disclosure has been described in detail, it should be understood that various changes, substitutions, and alterations can be made hereto without departing from the spirit and the scope of the invention as defined by the appended claims.

What is claimed is:

1. An information handling system comprising:
   a central processing unit coupled to a memory, wherein the memory further comprises a BIOS;
   a controller coupled to a nonvolatile memory;
   a register coupled to the central processing unit and the controller;
   wherein the controller is operable to:
   initialize communication with the BIOS;
   service commands from the BIOS; and
   confirm a command;
   wherein initialize communication with the BIOS comprises:
   receiving a signal from the BIOS requesting a key;
   generating the key;
   writing the key to the register;
   saving the key to the nonvolatile memory;
   generating a new key;
   saving the new key to the nonvolatile memory;
   encrypting a result of the command and the new key to form an encrypted result;
   wherein service commands from the BIOS comprises:

reading the command from the register;
decrypting the command;
executing the command; and
writing the encrypted result to the register; and
wherein confirm a command comprises:
creating a system management interrupt; and
reading a confirmation message from the register; and
wherein the central processing unit is operable to:
initialize communication with the controller;
send commands to the controller; and
confirm the command;
wherein initialize communication with the controller comprises:
sending the signal to the controller requesting the key;
reading the key from the register; and
saving the key to a SMRAM; and
wherein send commands to the controller comprises:
encrypting the command using the key;
writing the command to the register;
reading the encrypted result from the register;
decrypting the encrypted result; and
saving the new key to the SMRAM; and
wherein confirm the command comprises:
receiving the system management interrupt;
writing the confirmation message to the register; and
returning from the system management interrupt.

2. The system of claim 1, wherein the controller is further operative to service non-critical commands;
wherein service non-critical commands comprises:
reading a command from the register;
determining that the command is a non-critical command; and
executing the command if the command is a non-critical command.

3. A method for communication between a BIOS and a controller in an information handling system comprising:
initializing communication between the BIOS and the controller;
encrypting a command using a key by the BIOS;
sending the command to the controller;
processing the command by the controller;
receiving the result by the BIOS; and
confirming the command;
wherein initializing communication between the BIOS and the controller comprises:
generating the key by the controller;
sending a signal al from the BIOS to the controller requesting the key; and
writing the key to a register by the controller;
wherein sending the command to the controller comprises
writing the command to the register;
wherein processing the command by the controller comprises:
reading the command from the register;
decrypting the command using the key;
executing the command;
generating a new key; and
encrypting a result of the command and the new key with the key to form an encrypted result; and
writing the encrypted result to the register;
wherein receiving the result by the BIOS comprises:
reading the encrypted result from the register;
decrypting the encrypted result using the key; and
saving the new key in the SMRAM; and
wherein confirming the command comprises:
creating a system management interrupt by the controller; and
writing a confirmation into the register by the BIOS.

4. A software for communication between a BIOS and a controller in an information handling system, the software embodied in a non-transitory computer-readable medium and when executed operable to:
initialize communication between the BIOS and the controller;
encrypt a command using a key by the BIOS;
send the command to the controller;
process the command by the controller;
receive the result by the BIOS; and
confirm the command;
wherein initialize communication between the BIOS and the controller comprises:
generating the key by the controller;
sending a signal from the BIOS to the controller requesting the key; and
writing the key to a register by the controller;
wherein send the command to the controller comprises
writing the command to the register;
wherein process the command by the controller comprises:
reading the command from the register;
decrypting the command using the key;
executing the command;
generating a new key; and
encrypting a result of the command and the new key with the key to form an encrypted result; and
writing the encrypted result to the register;
wherein receive the result by the BIOS comprises:
reading the encrypted result from the register;
decrypting the encrypted result using the key; and
saving the new key in the SMRAM; and
wherein confirm the command comprises:
creating a system management interrupt by the controller; and
writing a confirmation into the register by the BIOS.

5. The method of claim 3 further comprising servicing a non-critical command by the controller, wherein servicing a non-critical command by the controller comprises:
determining that a command read from the register by the controller is a non-critical command; and
executing the command read from the register by the controller if the command is a non-critical command.

6. The software of claim 4 wherein the software, when executed, is further operable to service a non-critical command by the controller, wherein service a non-critical command by the controller comprises:
determining that a command read from the register by the controller is a non-critical command; and
executing the command read from the register by the controller if the command is a non-critical command.

* * * * *